Feb. 24, 1942. H. F. CURRY Re. 22,033

CONTAINER AND SEAM CLOSURE THEREFOR

Original Filed May 3, 1938 2 Sheets-Sheet 1

INVENTOR.
Hugh F. Curry
H. Lee Helms
ATTORNEY.

Feb. 24, 1942. H. F. CURRY Re. 22,033

CONTAINER AND SEAM CLOSURE THEREFOR

Original Filed May 3, 1938 2 Sheets-Sheet 2

INVENTOR.

Hugh F. Curry

BY H. Lee Helms

ATTORNEY.

Reissued Feb. 24, 1942

Re. 22,033

UNITED STATES PATENT OFFICE 22,033

CONTAINER AND SEAM CLOSURE THEREFOR

Hugh F. Curry, Englewood, N. J.

Original No. 2,178,778, dated November 7, 1939, Serial No. 205,666, May 3, 1938. Application for reissue July 31, 1941, Serial No. 404,950

5 Claims. (Cl. 229—48)

The object of the present invention is to provide a container which can be shipped in flat form, which can be used advantageously as a substitute for drums, barrels, tubs, pails, kits and baskets as customarily made, which will be cylindrical when placed in completed form, permitting the use of tight-fitting circular heads and enabling the lining of the containers with various materials or compounds such as paraffin, silica of soda, latex, paper, pulp, etc., which may be constructed of veneer, plywood, paper-board, or combinations of these materials; and which is formed without any overlapping.

One of the elements of the container is a seam in continuous strip form, in one or a plurality of parts, the strip or strips being formed with teeth which may be pressed through the material of the container.

These and other features of the invention will be described with reference to the accompanying drawings, in which:—

The problem which was overcome by my invention was the provision of container elements including seam and head elements which enable the formation of the container body in flat form with longitudinal seam closure member or members attached thereto and in such simple form as to be readily operated to form a completed tubular body in conjunction with base and head-holding elements of equally simple character, yet strong and rugged in construction, and adapted for quick attachment.

Figure 3A:
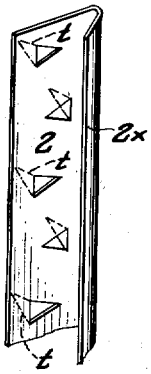
Figure 3A is a perspective view of one of the two coacting seam-closing strips shown in Figures 1 to 3 inclusive.
Figure 3B:
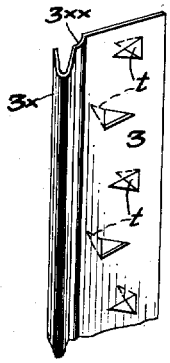
Figure 3B is a view of the seam-closing strip adapted to co-act with that shown in the preceding figure.
Figure 10:
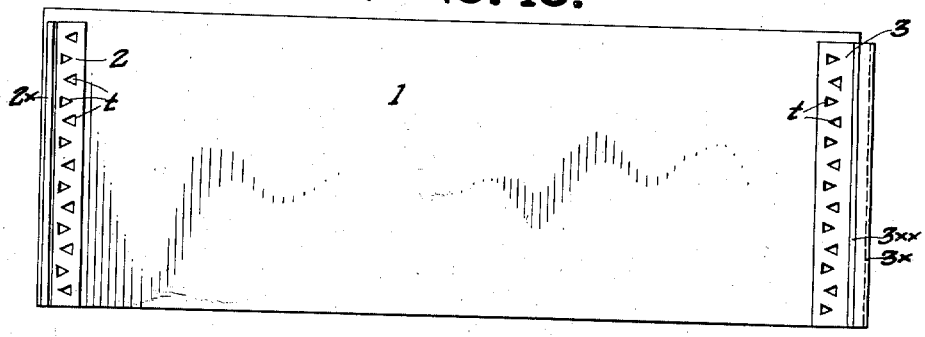
Figure 10 is a plan view of a container body panel in flat form.
Figure 11:
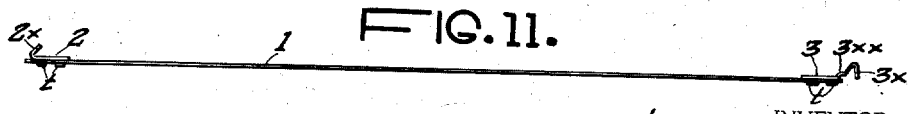
Figure 11 is an edge view of the same.

Referring to Figures 10 and 11, I have therein shown a body piece 1 in flat form which may be made of veneer, plywood, paper-board or other suitable flexible and preferably springy material. At the left-hand end thereof and extending vertically is a seam-closing staple strip 2, a fragment of which is shown in Figure 3A. The staple strip 2 is formed with a locking flange 2*x* and is V-cut, the metal being bent outwardly to form the staple teeth.

At its right-hand end the body piece 1 carries a staple strip 3 bent to form a longitudinally extending hook flange 3*x* connected to the main portion of the staple strip by a channel at 3*xx*.

The staple strip is V-cut at spaced points and the metal bent outwardly to form the staple teeth *t*. The staple teeth of each staple strip are driven into the appropriate margin of the container body piece and the teeth are then bent over as shown in Figure 3.

Figure 3:
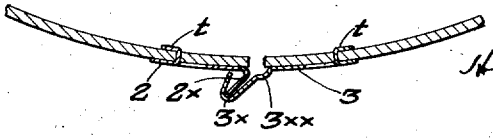
Figure 3 is a fragmentary horizontal section on the line 3—3, Figure 2.
Figure 12:
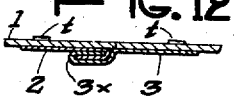
Figure 12 is a section of the structure shown in Figure 3 with the seam closing strips in closed position, effecting the abutment of the container body edges.

In forming the cylindrical body of the container, the body piece 1 is bent in annular form to bring the staple strips toward each other and the hook flange 3 of one staple strip is interlocked with the flange 2*x* of the second staple strip in the manner shown in Figure 3. This will leave the edges of the strip spaced, and when the interlocking structure is pressed downwardly to final position as shown in Figure 12, the edges of the body piece will be brought toward each other and into firm mutual contact as shown in said figure if the ends of the strip are sufficiently close together. The body strip being of relatively yielding material, the drawing action of the staple strip will effect such compression at the seam as to afford a satisfactory leak-proof joint.

Figure 1:
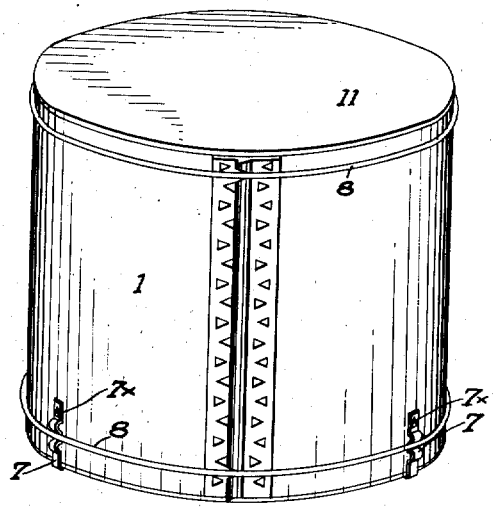
Figure 1 is a perspective view of a container constructed in accordance with the invention.
Figure 4:
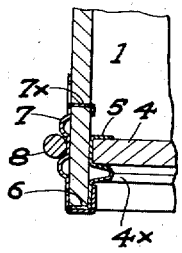
Figure 4 is an enlarged vertical section taken through the base of the container at one side thereof.
Figure 2:
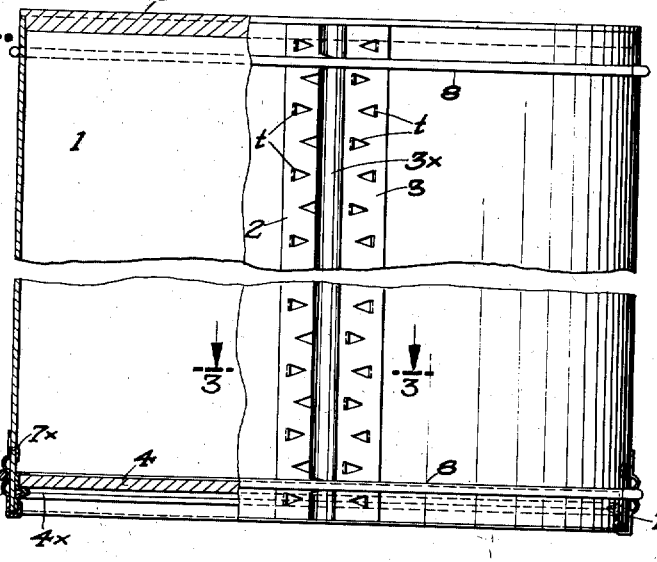
Figure 2 is an enlarged view of the same, partly broken away.

The base of the container may be closed by the instrumentalities shown in Figures 1, 2 and 4. In the said figures a base disk 4 is pressed downwardly within a metallic ring centrally formed with an inwardly projecting bead 4x, in such manner that an area of the ring will project above the disk. This area is then spun or pressed downwardly to form a top locking flange 5. Below bead 4x the ring may continue as a vertical depending extension and, if desired, the base of the ring may be outwardly bent at 6 to form an abutment wall for the base of the container body. Over upon the depending vertical extension of the beaded ring may be slipped a plurality of channeled locking clips 7, each clip near its upper end being V-cut and the metal bent in to form staple teeth 7x, which teeth are pressed into the container body and preferably bent over onto the inner face thereof, as indicated in Figure 4. In some cases, it will be then desirable to form each clip with spaced beads which may receive between them a reinforcing hoop preferably formed of wire as shown at 8, and at the point where the hoop meets the interlocked staple strips, the latter may be grooved to receive the hoop as indicated at the base of Figure 2.

Figure 5:
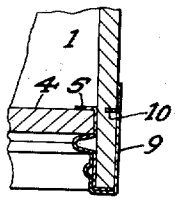
Figure 5 is a view similar to Figure 4, showing a modified form of container base.

In Figure 5 a modified form of base construction is shown in which the disk 4 and its immediate holding member 5 are of the same construction as that shown in Figure 4, and hence bear the same reference characters.

When the base disk is inserted into the lower end of the tubular body it is held in position by a plurality of spring clips 9 cut to provide one or more prongs 10 which may be pressed into the outer face of the container body. Thus each clip 9 is similar to that shown in Figure 4, except that it omits holding means for a ring such as 8.

The top of the container may be closed by a closure member 11 shouldered to abut the top of the container body.

Figure 9:
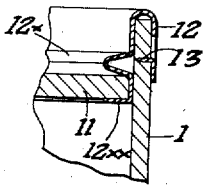
Figure 9 is a view similar to Figure 8, showing a modified form of container head construction.
Figure 7:
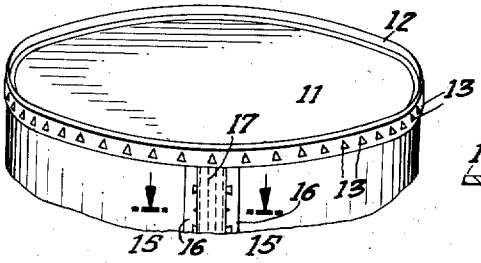
Figure 7 is a perspective view showing an upper end portion of a modified form of container constructed in accordance with the invention.

The top closure for the container may be of the construction shown in Figures 9 and 7. In that case, the closing disk 11 is moved within a deeply channeled and beaded ring 12, the channel being adapted to receive an upper margin of the container body. The closure disk will be abutted with a bead 12x of ring 12 and thereupon the lower margin of the ring at the point 12xx will be bent or spun down upon the closure disk to hold it in position. The staple teeth 13 of the ring may be driven into the wall of the container as shown in Figure 9. In practice, the vertical area of the channel ring carrying the teeth 13 may be spread outwardly so that the teeth may lie in their usual transverse position relatively to the channel and be driven into the body of the container by compression of the channel area of the ring against the opposite faces of the container body.

Figure 6:
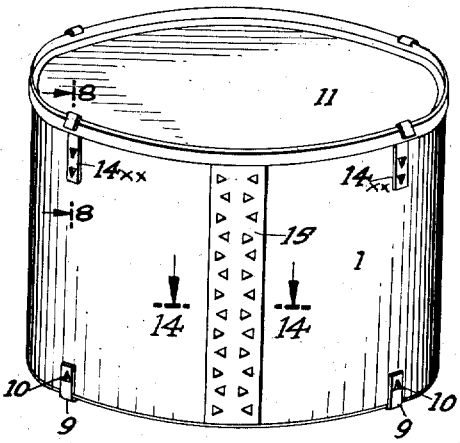
Figure 6 is a perspective view of a modified form of container.
Figure 8:
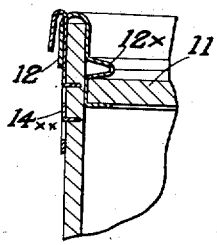
Figure 8 is a vertical fragmentary section taken on the line 8—8, Figure 6.

To enable ready removal of the container closure and replacing thereof and, at the same time, provide means for holding the closure firmly in position, the channel ring may omit the staple teeth and in lieu thereof be formed with a plurality of slots to receive the upper and bendable sections of a plurality of holding clips 14xx, as shown in Figures 6 and 8. Each clip is preferably formed with a plurality of staple teeth driven into the wall of the container and when the closure disk is in position the upper ends of each clip may be bent over into locking position, as shown in Figure 8.

Figure 13:
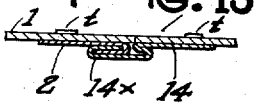
Figure 13 is a view similar to Figure 12, showing a modified form of seam closing joint.

In Figure 13 I have shown a longitudinal seam-connecting staple strip similar to that of Figure 12 in that the member 2 is the same as the corresponding member of Figure 12, the locking extention is bent back upon itself at its juncture with the hooked portion thereof to impart greater rigidity to the structure, the hooked portion being indicated at 14x and the said staple strip as a whole being indicated at 14.

Figure 14:
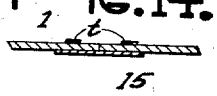
Figure 14 is a transverse section on the line 14—14, Figure 6.

In certain types of light gauge containers the longitudinal seam may be closed by a staple strip consisting of a simple band as shown in Figures 6 and 14, at 15, each longitudinal margin of the band being formed with a plurality of V-cuts and the metal bent outwardly to provide spaced lines of staple teeth which are forced into the abutting margins of the container body 1 and preferably are headed over onto the inner face thereof.

Figure 15:
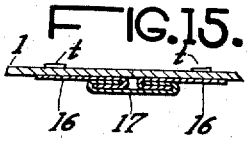
Figure 15 is a transverse section on the line 15—15, Figure 7.

In heavier types of container bodies, each longitudinal margin may carry a staple strip 16, Figure 15, reversely bent to form a hook, the hooks of the two strips lying opposite each other and adapted for connection by a double flange-connector strip 17. The hook flanges of members 16 and 17 will initially be bent outwardly so as to be capable of interlocking while the longitudinal seam edges of the container body 1 are separated and when the member 17 is applied and given compression toward the container body the parts will assume the position shown in Figure 1, if the ends of the container body are sufficiently close together, wherein the edges of the container are closely abutted and held firmly in such position.

Each of the members 16 will be formed with a plurality of V-cuts and the metal bent to provide staple teeth which will pass into the container body and will preferably be headed over upon the inner-face thereof.

Having described my invention what I claim and desire to secure by Letters Patent is as follows:

1. A container comprising a body piece of flexible material adapted to be bent into cylindrical form, a flanged staple strip having teeth connecting it with the body piece at one marginal edge thereof, a second staple strip having teeth connecting it with the body piece at the opposite marginal edge thereof and formed with a flange adapted to interlock with the flange of the first-named staple strip, the said staple strips flanges being adapted, after interlocking and compression, to move the longitudinal edges of the body piece into mutual abutment.

2. A flat container body piece of flexible material adapted to be bent into cylindrical form, a flange staple strip carried by the body piece at one end margin thereof and having teeth imbedded into the body piece, and a second staple strip carried at the opposite end of the body piece and having teeth imbedded therein, the second staple strip being formed with a hook flange adapted to engage the flange of the first staple strip, the two flanges being so formed as to cause a movement of the end edges of the strip toward each other when the flanges are compressed in a direction toward the cylindrical body formed by their interlocking.

3. A flat container body piece of flexible material adapted to be bent into a tubular body, a flange strip, means for securing said flange strip to the body piece at one end margin thereof, and a second strip, means for securing said second strip to the opposite end of the body piece, the second strip being formed with a hook flange adapted to engage the flange of the first strip, the two flanges being so formed as to cause a movement of the end edges of the strip toward each other when the flanges are compressed in a direction toward the tubular body formed by their interlocking.

4. A container comprising a body piece of flexible material bent into a substantially cylindrical form, a flanged strip extending along one marginal edge of the body piece with the flange extending outwardly from the cylindrical form on the exterior thereof, means for connecting said flanged strip with the body piece at said marginal edge thereof, a second strip extending along the opposite marginal edge of the body piece and formed with a flange on the exterior of the cylindrical form extending outwardly and inwardly from the cylindrical form and interlocking with the flange of the first-mentioned strip, means for connecting said second strip with the body piece at said opposite marginal edge thereof, the said flanges of the strips when so interlocked holding the ends of said body piece substantially in aligned position.

5. A container comprising a body piece of flexible material bent into a tubular form, a flanged strip extending along one marginal edge of the body piece with the flange extending outwardly from the tubular form on the exterior thereof, means for connecting said flanged strip with the body piece at said marginal edge thereof, a second strip extending along the opposite marginal edge of the body piece and formed with a flange on the exterior of the tubular form adapted to interlock with the flange of the first-mentioned strip, means for connecting said second strip with the body piece at said opposite marginal edge thereof, the said flanges of the strips being adapted when interlocked to hold the ends of said body piece in position, and means for closing the top and bottom of said body, said last mentioned means preventing the disengagement of the interlocked flanges.

HUGH F. CURRY.